United States Patent [19]

Duckeck et al.

[11] Patent Number: 5,065,452
[45] Date of Patent: Nov. 12, 1991

[54] DIGITAL TRAFFIC NEWS EVALUATION METHOD

[75] Inventors: Ralf Duckeck; Peter Brägas, both of Hildesheim, Fed. Rep. of Germany

[73] Assignee: Robert Bosch GmbH, Stuttgart, Fed. Rep. of Germany

[21] Appl. No.: 447,165

[22] Filed: Dec. 7, 1989

[51] Int. Cl.[5] .................... H03M 13/00; H04B 1/06
[52] U.S. Cl. .................................. 455/226; 455/186; 455/345; 371/57.2
[58] Field of Search ............... 455/67, 186, 226, 345, 455/228; 371/37.1, 57.1, 57.2; 364/436; 340/905

[56] References Cited

U.S. PATENT DOCUMENTS

| | | | |
|---|---|---|---|
| 3,949,401 | 4/1976 | Hegeler | 343/200 |
| 4,380,821 | 4/1983 | Eckhardt et al. | 455/33 |
| 4,435,843 | 3/1984 | Eilers et al. | 455/205 |
| 4,450,589 | 5/1986 | Eilers et al. | 455/205 |
| 4,499,603 | 2/1985 | Eilers | 455/205 |
| 4,862,513 | 8/1989 | Brägas | 455/45 |
| 4,888,699 | 12/1989 | Knoll et al. | 364/449 |
| 4,903,269 | 2/1990 | Fedele | 371/57.2 |

FOREIGN PATENT DOCUMENTS

| | | |
|---|---|---|
| 3536820 | 4/1987 | Fed. Rep. of Germany . |
| 3633881 | 4/1988 | Fed. Rep. of Germany . |
| 2554618 | 5/1985 | France . |
| 0044630 | 2/1989 | Japan ................ 455/226 |
| 0044632 | 2/1989 | Japan ................ 455/226 |
| 0044634 | 2/1989 | Japan ................ 455/226 |
| 0044635 | 2/1989 | Japan ................ 455/226 |
| 2050767 | 1/1981 | United Kingdom . |

OTHER PUBLICATIONS

Boretz, "TravelPilot System Set for End-of-Year Debut", Automotive Electronics Journal, Jan. 29, 1990, p. 19.
Specifications of the Radio Data System RDS for VHF/FM Sound Broadcasting (Eur. Bdcastg. Union, Mar. '84), also known as EBU Technical Standard 3244-E (60 pages).

Primary Examiner—Reinhard J. Eisenzopf
Assistant Examiner—Chi H. Pham
Attorney, Agent, or Firm—Frishauf, Holtz, Goodman & Woodward

[57] ABSTRACT

In a method for evaluating traffic announcements received in digitally encoded form in a data packet, the data packet is decoded, and after the evaluation the traffic announcements are stored in memory. Under poor broadcasting conditions, it may be uncertain whether all the traffic announcements transmitted have actually been correctly received and evaluated. For confirmation of completeness, data words that, in encoded form, include the nominal number of reports transmitted in one cycle are broadcast within each complete cycle of traffic announcements. The decoded and evaluated reports counted within one cycle are compared with this nominal number.

13 Claims, 3 Drawing Sheets

FIG.1
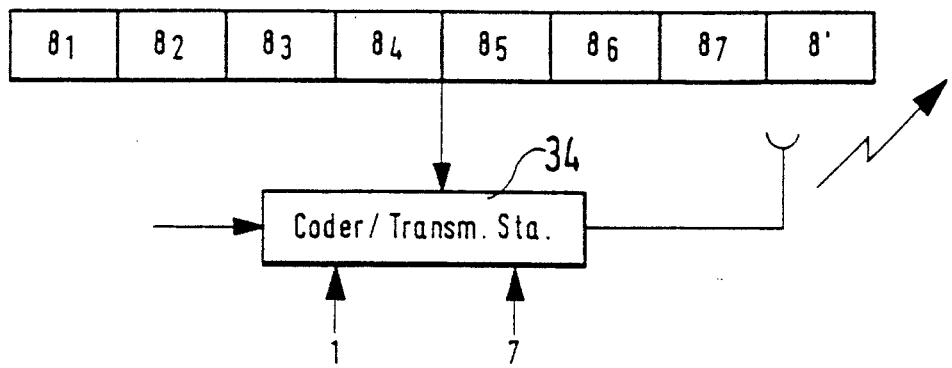
FIG.2
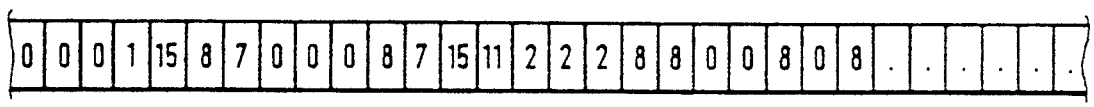
FIG.3(a)
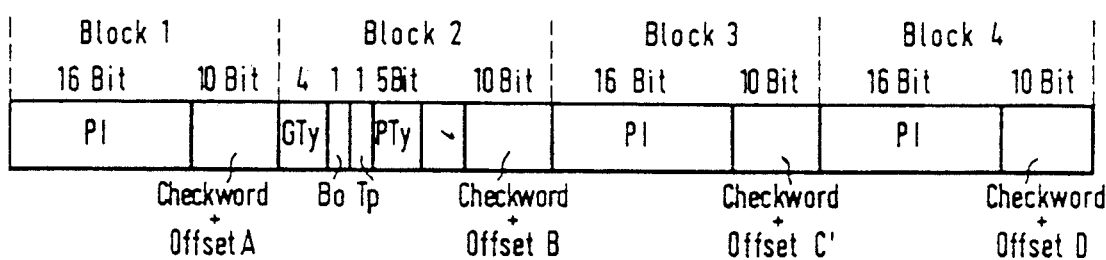
FIG.3(b)
| u 0 | Type 1<br>1 Sequence Report | Type 2<br>2 Sequence Report |
|---|---|---|
| | | |
| u 1 | Type 3<br>3 or more Sequ. Rpt. | Type 4<br>Non-traffic Ann. |

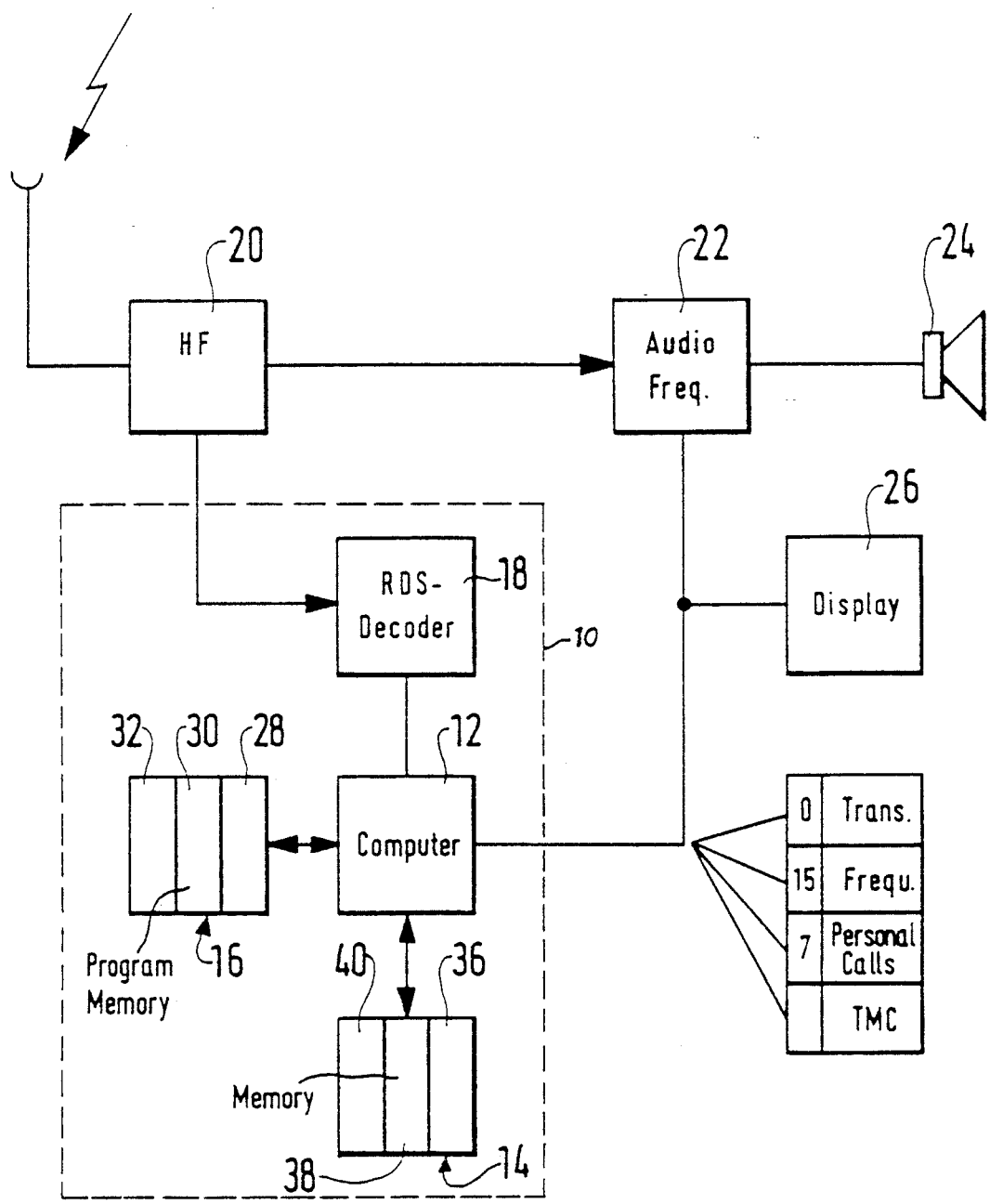

DIGITAL TRAFFIC NEWS EVALUATION METHOD

Cross-reference to related U.S. patent and applications, the disclosures of which are hereby incorporated by reference:
U.S. Pat. No. 3,949,401, HEGELER; U.S. Pat. Nos. 4,435,843 and 4,450,589, EILERS and BRAGAS;
U.S. Pat. No. 4,499,603, EILERS;
Ser. No. 07/447,378, DUCKECK, filed Dec. 7, 1989 based on German P 38 20 639.0 of June 18, 1988);
Ser. No. 07/447,578, DUCKECK, filed Dec. 7, 1989 based on German P 38 20 641.2 of June 18, 1988).

FIELD OF THE INVENTION

The invention relates to a method for evaluating traffic announcements, received in digitally encoded form in a data packet. The European Broadcasting Union's SPECIFICATIONS OF THE RADIO DATA SYSTEM RDS FOR VHF/FM SOUND BROADCASTING (March 1984), also known as Technical Publication 3244-E or EBU-3244-E.

With the introduction of the RDS system, it is possible to broadcast not only the tone modulation of an FM radio program but also data. A suitable traffic radio decoder that is arranged for processing digital signals is known from German Patent Disclosure Document DE-OS 35 36 820 BRAGAS and BUSCH. The digital signals are obtained by demodulating an auxiliary carrier that is broadcast along with an FM radio program via radio transmitters. As a result, not only information on the stations received and on the content of the program but also traffic announcements can also be decoded. Compared with traffic announcements that are transmitted in the clear or audible form of tone modulation, either after interrupting the ongoing program or at predetermined times, broadcasting of digital signals offers the opportunity of transmitting traffic announcements without interrupting the program. It is possible to transmit short encoded announcements that then address and trigger retrieval of standardized texts stored in memory in the receiver.

Preparation and transmission of the traffic announcements are done in the traffic studio, where the incoming reports are fed into a personal computer that forms encoded information from them. The computer then assembles all the reports into a report block, which may be of variable length. The report block is then inserted into the data packet, but it is not broadcast in a continuous sequence; instead, other groups of the data packet that are broadcast more frequently are interspersed in it.

Under poor reception conditions, as may be particularly prevalent in vehicle radio receivers, it is possible that parts of the data packet transmitted may not be decoded correctly or may even be lost completely. In practice, only an approximately 20% decoding probability is therefore expected. This means that it is not assured that all the reports of a report block, which is assembled as a cycle of traffic announcements, will be recognized after the block has been broadcast. If the decoded reports are then stored in memory, there is no certainty that all the reports are in fact present.

It is the object of the invention to improve a method for evaluating traffic announcements received in digitally encoded form in a data packet in such a way as to improve the certainty of having recognized and evaluated all the reports.

Transmitting data words that include the nominal number of reports transmitted in one cycle furnishes a check number or datum whose valve is independent of reception conditions and independent of the accuracy of decoding and evaluation. This datum can then be compared with the number of reports actually decoded and evaluated within one cycle. If the number of reports decoded and evaluated matches the nominal number, there is a high degree of certainty that the reports transmitted have all been received.

Preferably, the nominal number of data words transmitted in one cycle is transmitted at the end of the cycle associated with these data words. The advantage of this provision is that by the transmission of these data words, the end of the cycle is simultaneously defined, and in the event that the nominal and actual number of reports match, these reports can then be saved immediately afterward by means of memories. EBU 3244-E defines a data Group 104 bits long, consisting of Block 1 through Block 4, each 26-bit Block having a 16-bit Information word followed by a 10-bit Checkword.

The transmission of the data words containing the nominal number is suitably done in block 4 of the RDS-TMC (traffic message channel) group. According to the "SPECIFICATION OF THE RADIO DATA SYSTEM RDS FOR VHF/FM SOUND BROADCASTING", EBU, March 1984, pages 12, 14, 15, if the offset word in block 3 is C', 16 data bits are available in block 4. These 16 bits then can be used to transmit the aforementioned data words.

The invention also relates to a radio receiver, in particular a vehicle receiver, having a decoder for decoding traffic announcements received in digitally encoded form, Accordingly, the object of the invention is to improve a radio receiver so as to increase the certainty that all the reports of traffic announcements have been received and evaluated.

DRAWINGS

Further features and advantageous embodiments of the invention will become apparent from the further claims, the description and the drawing, which explain the invention in further detail.

Shown in the drawing are:

FIG. 1, a graphic illustration of a report block as delivered to an encoder;

FIG. 2, in chronological succession, the RDS groups occurring in a broadcast data stream;

FIGS. 3(a) and 3(b) the layout of the RDS group 8 containing the traffic reports; and FIG. 4 a block circuit diagram of a radio receiver having a decoder.

FIG. 5, a flow chart of the traffic report evaluating process according to the present invention.

DETAILED DESCRIPTION

Figure 5:
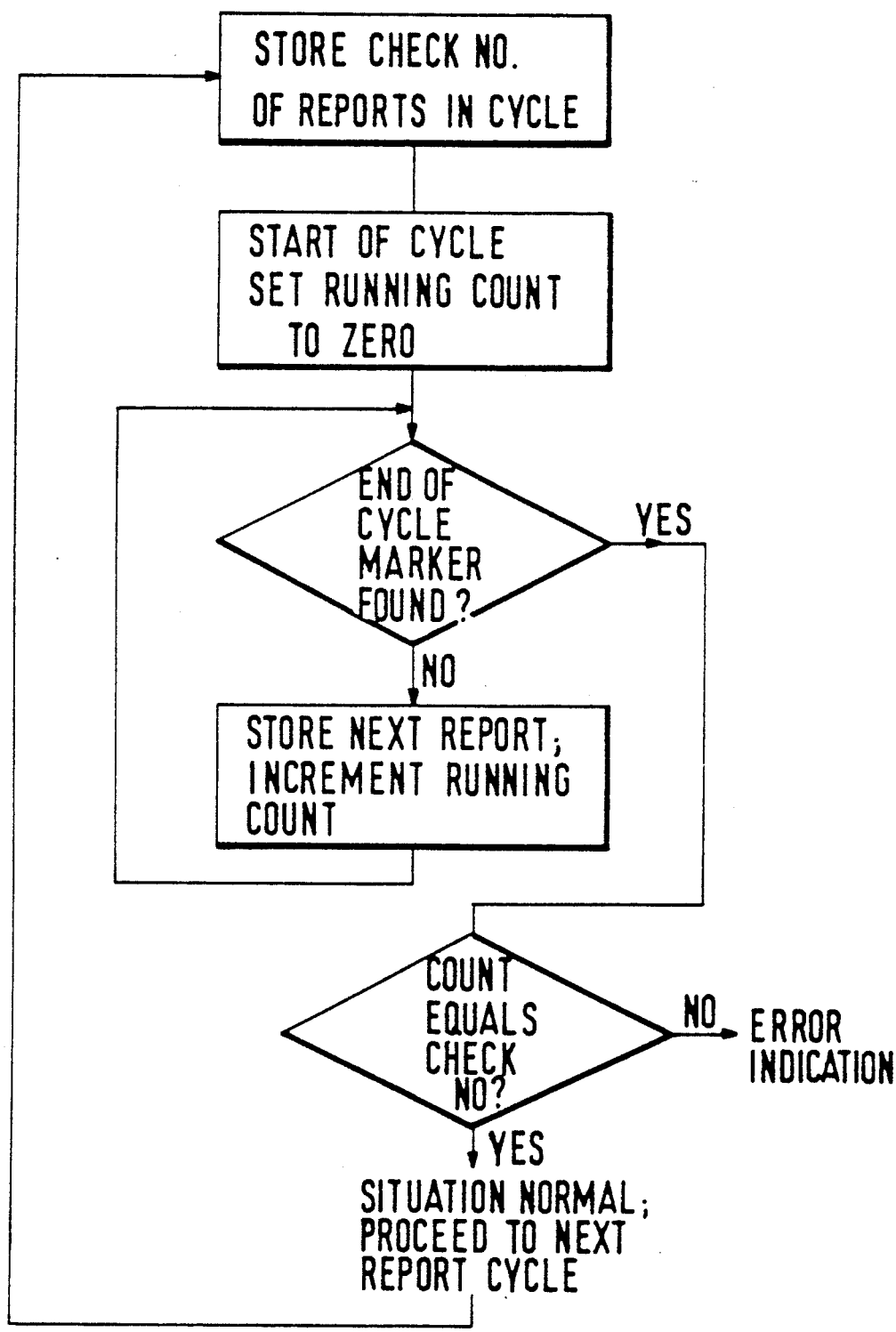

FIG. 1 shows a report block of seven RDS-TMC groups, and this block ends with a further group containing the nominal number of reports present in the report block. The number of reports in the report block is here selected arbitrarily and depends on how many reports are present, based on the current traffic situation. The report block can accordingly have variable lengths. Moreover, the length is dependent on whether the traffic announcements are short enough to be encoded in the form of standardized brief information items, or are more extensive.

Statistically, approximately 90% of all traffic announcements can be broadcast in the form of one-sequence reports. Approximately 7 to 8% are two-sequence reports, and the rest are multiple sequence reports. Accordingly, if all the reports are one-sequence reports, then seven of them can be transmitted in the report block. The report block is next fed into an encoder-transmitter 34, which broadcasts the traffic announcements along with other data in the form of a data packet. It is further noted that the encoder-transmitter 34 is also supplied with groups 1 and groups 7.

FIG. 2 schematically shows a data stream of RDS groups as they are broadcast in chronological succession. It can be seen that one coherent TMC report block from RDS group 8 is not broadcast as an entire block, but instead is shuffled among other RDS groups. The other RDS groups are sometimes transmitted more frequently, to increase the transmission certainty for these groups.

FIG. 3 shows the layout of an RDS TMC group, that is, group 8. This group includes four blocks, namely block 1, block 2, block 3 and block 4; each block includes 26 bits. Of these bits, the first 16 bits are data words and the last 10 bits are a check word for error recognition and an offset as a synchronizing word.

In block 1, the first 16 bits include the program identification PI, that is, information about the transmitter or radio station. In block 2, the first four bits are reserved as a group code GTy. In this case this is group 8. The next bit is the offset code BO. If this bit is 1, then in block 3 the offset is C'. If BO is equal to 0, then in block 3 the offset is C. The offset code is followed by the ARI identification bit TP and another five bits, which are reserved for the program type PTy. C If the offset in block 3 is equal to C', then in the data part of block 3 the program identification PI is transmitted. From this it can be concluded that 16 bits are free in the data region of the ensuing block 4. These bits can be used for identifying, in encoded form, the nominal number of reports transmitted in one cycle of traffic announcements.

Since as already mentioned in conjunction with FIG. 1 the reports may be of variable length, the data words containing the nominal number may include additional information on the length of the reports. The length of the reports is divided into sequences that must be transmitted if a report is to be complete. A onesequence report can be accommodated within a single RDS group. A two-sequence report requires two RDS groups, which as also noted above may be broadcast with interruptions by other RDS groups.

To enable a distinction to be made among different types of reports, the information on the length of reports is divided into four types; the first type includes the one-sequence reports, the second type includes the two-sequence reports, the third type includes the reports having three and more sequences, and the fourth type includes the special announcements that do not pertain to traffic. Type 1 and 2 reports, on the one hand, and types 3 and 4, on the other, can each be accommodated in the data part of block 4. If reports of all four types are required, then the data words must be broadcast in the form of two-sequences. The distinction between the two data words is made by means of a distinguishing bit U preceding them. If this bit is 0, then the data word includes the numbers of one-sequence and two-sequence reports. Conversely, if the distinguishing bit is 1, then the data word includes the number of reports having more than two sequences and of the announcements not pertaining to traffic.

The one-sequence and three-sequence reports occupy eight bits and can thus identify up to 256 reports of the applicable type. The two-sequence reports and announcements not pertaining to traffic occupy seven bits and can thus identify up to 128 reports transmitted in one cycle. The announcements not pertaining to traffic may be CPU information or updating data for the EVA system.

The RDS group pertaining to the nominal number of reports within one cycle is transmitted at the end of one cycle, so that here not only the information as to the number of the reports but also the end of the traffic announcement cycle is marked.

FIG. 4, finally, shows a block circuit diagram of a radio receiver of a kind suitable for receiving RDS signals. The radio receiver includes a high frequency (HF) part 20, a low frequency (NF) part 22, a loudspeaker 24, a decoder 10 and a display device 26. Signals arriving via the antenna, as transmitted by the encoder-transmitter 34 in FIG. 1 are demodulated in the high frequency part 20, and the tone modulation is delivered to the low frequency part 22, which passes it on to the loudspeaker 24.

The demodulated auxiliary carrier is supplied to an RDS decoder 18 that decodes the data packet and is present in the decoder 10.

At the output of the decoder, there is an indication as an example of which information or data are available after evaluation of the applicable RDS groups. For instance, RDS group 0 includes information on the transmitter or radio station; RDS group 15 includes information on the frequencies; RDS group 7 includes personal calls, and RDS group 8 includes the traffic announcements under discussion here. Group 8 is called the TMC group, for traffic message channel.

The individual groups, in other words including group 8 as well, are evaluated, after the aforementioned decoding in the decoder 18, by a computer 12. The computer 12 is controlled by a control program stored in memory locations 28 of a program memory 16. The evaluated traffic announcements reach memory locations 36 of a memory 14. From the decoded data words, the computer 12 can form standardized traffic announcements, which are delivered to the low frequency part 22 and to the display device 26 and are reproduced via the loudspeaker 24 in the form of synthetic speech and/or via the display device 26 in the form of alphanumeric characters.

During the incoming data stream of RDS-TMC groups, the groups are counted and the numbers are recorded in memory locations 38 of the memory 14. At the end of the cycle, if the RDS-TMC group having the nominal number of reports has been received and evaluated, then this number is stored in memory locations 40 of the memory 14.

Next, the numbers stored in memory locations 38 and 40, that is, the actual number of reports received and evaluated, are compared with the nominal number. If they match, then the traffic announcements stored in memory locations 36 of the memory 14 can be considered valid. Otherwise, they are marked as invalid.

Using the nominal numbers, it is also possible to occupy memory locations 36 inside the memory 14 and, after first temporarily storing the announcements in memory, to inscribe the traffic announcements into these memory locations after finding a match between the actual and nominal numbers.

Besides the number of reports, the number of sequences can also be calculated and checked, in the event that traffic announcements, for instance, involve reports of variable length.

The evaluation of the data words containing the nominal numbers of reports substantially increases the decoding certainty, so that with a decoding probability of 20%, the case in which a cycle of traffic announcements has been broadcast and evaluated completely can be recognized with certainty. The computer configuration can also be simplified, if the recognition of correctly broadcast traffic announcements makes it possible to reduce the expense and effort for error-correction provisions.

We claim:

1. A method for evaluating traffic announcements received in digitally encoded form in a data packet forming part of a broadcast radio signal a complete cycle of reports and data being repeated periodically, comprising the steps of decoding said data packet from said broadcast signal;

evaluating said data packet to generate elements of traffic announcements;

storing said traffic announcements in a memory (14);

said evaluating step including identification and storage of a variable-value check number, contained in a predesignated portion of said data packet, which indicates a total number of reports which are being broadcast during a current cycle of data, and maintenance of a running count of reports actually received in said cycle;

and comparing, at an end of each cycle, said stored variable-value check number with said running count of reports actually received, thereby permitting checking, of traffic announcement data received, for omissions due to poor transmission conditions.

2. The method of claim 1, wherein said predesignated portion of said data packet is adjacent the end of the cycle, thereby facilitating immediate execution of said comparing step upon conclusion of each cycle.

3. A method for evaluating traffic announcements received in digitally encoded form in a data packet forming part of a broadcast radio signal, a complete cycle of reports and data being repeated periodically, comprising the steps of decoding said data packet from said broadcast signal;

evaluating said data packet to generate elements of traffic announcements;

storing said traffic announcements in a memory (14);

said evaluating step including identification of a check number, contained in a predesignated portion of said data packet, which indicates a total number of reports which are being broadcast during a current cycle of data, and maintenance of a running count of reports actually received in said cycle;

and comparing, at an end of each cycle, said stored check number with said running count of reports actually received, thereby permitting checking, of traffic announcement data received, for omissions due to poor transmission conditions; and wherein said predesignated portion of said data packet contains not only said check number but also indications as to the length of respective ones of said reports.

4. The method of claim 3, wherein the indication as to the length of the reports includes the number of sequences of one group of the data packet that one report, in order to be completely represented, occupies.

5. The method of claim 4, wherein a cycle of data includes traffic report sequences which may be separated from one another by other types of data, and said evaluating step includes distinguishing between four types of length indications, namely a first type including the one-sequence reports, a second type including the two-sequence reports, a third type including the reports of more than two sequences and a fourth type including the special announcements not pertaining to traffic.

6. The method of claim 4, further comprising ascertaining a nominal number of sequences contained in one complete cycle comparing, with said nominal number, the sequences decoded and evaluated within one cycle.

7. The method of claim 5, wherein said data packet is coded according to EBU-3244-E and the data words having the nominal number of the reports broadcast in one cycle are broadcast in block 4 of the RDS-TMC (Traffic Message Channel) group, as soon as the offset word in block 3 is C'.

8. The method of claim 5, wherein the data words having the nominal number of reports broadcast in one cycle are broadcast in two sequences, wherein the first and second type, on the one hand, and the third and fourth type, on the other, each form one data word.

9. The method of claim 8, wherein the data words having the nominal number of the first and second type are distinguished from those of the third and fourth type by the state of a preceding distinguishing bit.

10. The method of claim 9, characterized in that the nominal numbers of the first and third type occupy eight bits, and the nominal numbers of the second and fourth type occupy seven bits.

11. A vehicle radio receiver having a decoder (18) decoding traffic announcements received in digitally encoded form, having a computer (12), having an input connected to an output of said decoder (18), for evaluating a received data packet and a memory (14), bidirectionally coupled to said computer (12), for storing the traffic announcements, wherein the computer (12) includes a program memory (16) having a control program, by means of which said computer is controlled in such a way that data words within each complete cycle of traffic announcements, which in encoded form include a variable-value nominal number of reports broadcast in the current cycle, are decoded and evaluated, and that the reports decoded and evaluated within this same cycle are counted and compared with the nominal number.

12. The radio receiver of claim 11, wherein a second control program is present in the program memory (16), by means of which program additional indications as to the length of the reports, in particular of the sequences of the data packet that are occupied by the reports, are ascertained and, from them, the nominal number of sequences contained in one complete cycle is calculated, and that the sequences decoded and evaluated within one cycle are compared with the nominal number.

13. The radio receiver of claim 11, wherein a third control program is present in the program memory (16), which program determines, based upon the nominal number, the required size of a memory zone to be reserved for storage and which evaluates whether the nominal number matches the decoded and evaluated reports or sequences, and on that basis decides whether to write, into the reserved zone of the memory (14), the traffic announcements.

* * * * *